(12) United States Patent
Chene et al.

(10) Patent No.: US 7,073,904 B2
(45) Date of Patent: Jul. 11, 2006

(54) SPECTACLE FRAME WITH OVER-OPENING ABOUT A SHIFTED BEARING POINT

(75) Inventors: Richard Chene, Neuilly sur Seine (FR); Dominique Delamour, Les Mesnuls (FR); Olivier Rodi, Gambais (FR)

(73) Assignee: Alain Miklitarian, Paris (FR)

( * ) Notice: Subject to any disclaimer, the term of this patent is extended or adjusted under 35 U.S.C. 154(b) by 0 days.

(21) Appl. No.: 10/527,808

(22) PCT Filed: Jun. 16, 2004

(86) PCT No.: PCT/FR2004/001489

§ 371 (c)(1),
(2), (4) Date: Mar. 14, 2005

(87) PCT Pub. No.: WO2004/113996

PCT Pub. Date: Dec. 29, 2004

(65) Prior Publication Data

US 2006/0050226 A1 Mar. 9, 2006

(30) Foreign Application Priority Data

Jun. 20, 2003 (FR) .................................. 03 07454

(51) Int. Cl.
*G02C 5/22* (2006.01)

(52) U.S. Cl. ........................................ 351/153; 16/228

(58) Field of Classification Search ................ 351/153, 351/119–121; 16/228
See application file for complete search history.

(56) References Cited

U.S. PATENT DOCUMENTS 4,456,346 A * 6/1984 Beyer .......................... 351/153
5,515,575 A    5/1996 Pinazza ........................ 16/228

FOREIGN PATENT DOCUMENTS

| EP | 0 177 821 | 4/1986 |
| EP | 0 266 307 | 5/1988 |
| EP | 0 889 347 | 1/1999 |
| EP | 0 992 831 | 4/2000 |
| FR | 2 816 072 | 5/2002 |

* cited by examiner

*Primary Examiner*—Huy Mai
(74) *Attorney, Agent, or Firm*—Young & Thompson

(57) ABSTRACT

A spectacle frame includes sliding hinges which enable the arms to move from a stable open position, in which the end (306) of the arms is parallel to the end (313) of the endpiece (307), to an unstable wide-open position, by pivoting around a support point (311) belonging to a coincidence plane (P,P') which passes between the knuckles (C1, C2) of the hinges. The frame, which has a plane of symmetry (X,X'), is characterised in that the support point (311) is located closer to the plane of symmetry (X,X') of the frame than the outer face (309) of the arms at the coincidence plane (P, P').

8 Claims, 5 Drawing Sheets

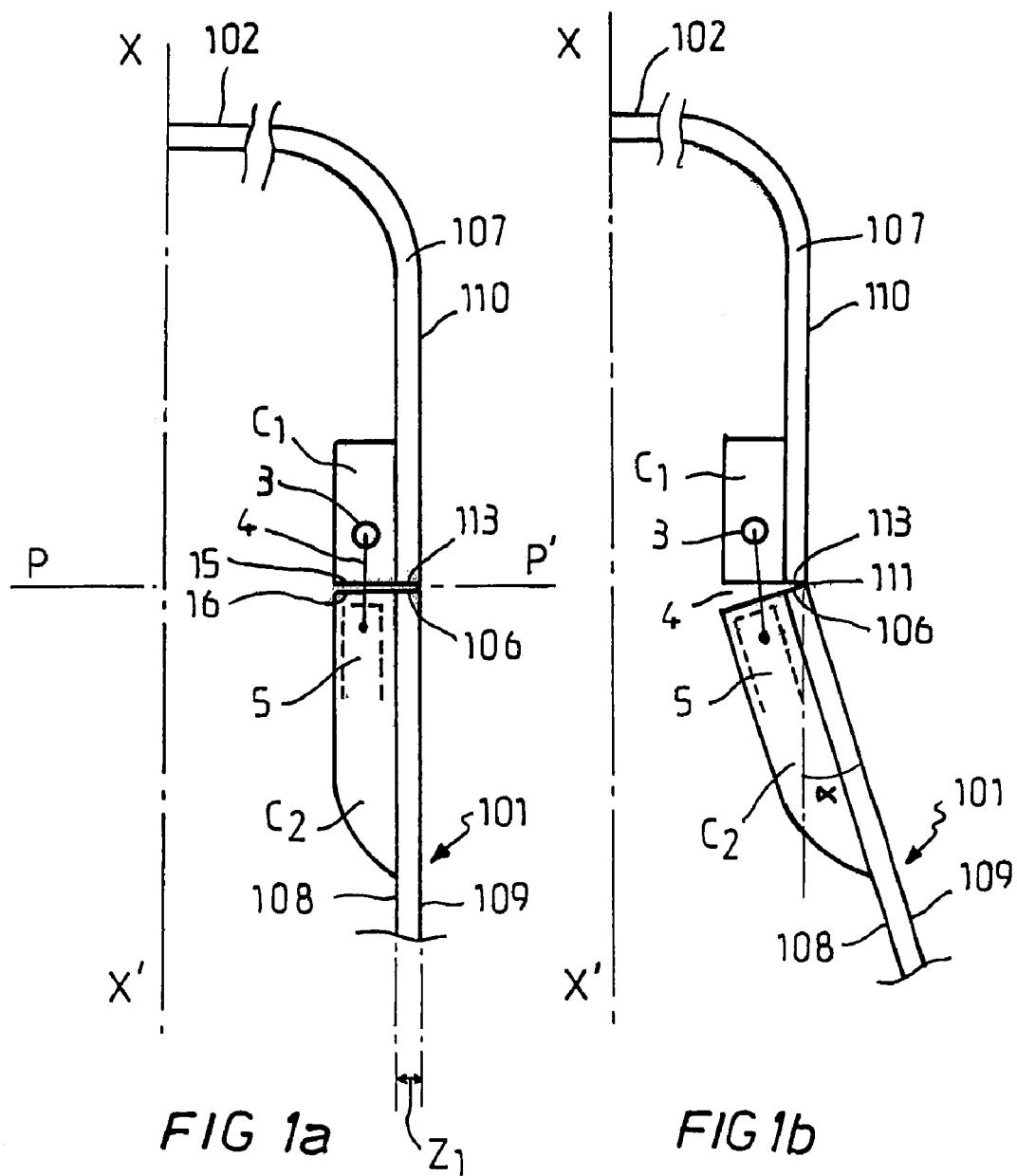

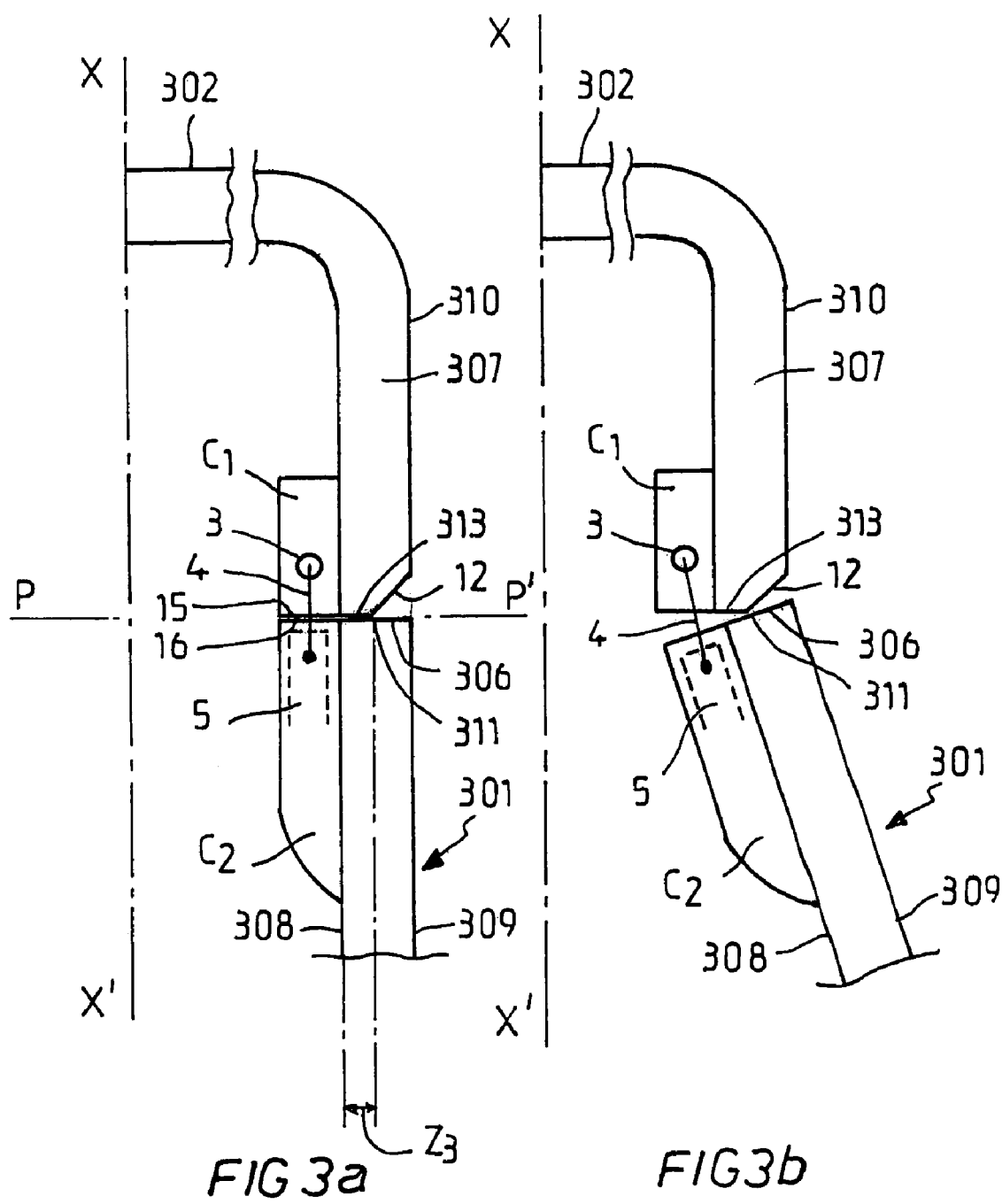

SPECTACLE FRAME WITH OVER-OPENING ABOUT A SHIFTED BEARING POINT

The present invention relates to a spectacle frame comprising a hinge of "telescopic" type.

"Telescopic" hinges which, like most hinges, comprise two elements, bearing on one another and connected by a rotation pin, at least one of the two elements being movable, have the particular feature of including, in the movable element, a tie-rod mounted so as to slide in a housing and comprising a means for cooperating with the rotation pin, and a return spring.

When a spectacle frame is being fitted to a wearer's face, these telescopic hinges are advantageous because they allow over-opening of the sides, generally by 2 to 8°, which facilitates fitting, particularly if this is done by another third party (the optician). The telescopic hinges also improve the fit of the frame to the face since, because the over-opened position is unstable, once the sides are released by the person fitting the frame they come to bear against the sides of the wearer's face, under the action of the return spring.

To ensure a comfortable fit for the wearer, it is important that the sides bear against the sides of the face with enough force to keep the spectacle frame in place but not so much as to be unbearable, the intensity of this bearing force depending on the return force.

Telescopic hinges are mass-produced and delivered in the assembled state to lens manufacturers, so that the latter or the optician cannot adjust their return force.

In the over-opened position, the hinge-side end of the sides, known as the proximal end, bears against a point on the hinge-side end, known as the proximal end, of a stub forming part of the frame face, thus creating a lever arm whose size is proportional to the thickness of the sides.

When the hinges are secured to thin sides, for example made of metal, this bearing point is located near to the rotation pin of the telescopic hinges.

On the contrary, when the telescopic hinges are secured to thick sides, as sides made of acetate or injection-moulded thermoplastic usually are, these materials being commonly used to make spectacle frames, the bearing point is significantly shifted with respect to the rotation pin of the hinges, with the result that, for the same angle of over-opening, the return force of the sides must be much greater than in the case of thin sides, to the extent that it impairs the wearer's comfort. The only option for the optician to remedy this is to deform the sides of the frame, an operation that is all the trickier the thicker the sides.

The invention proposes a solution so that the return force of the spring is the same from one frame model to another, and more precisely whatever the thickness of the frame.

The type of spectacle frame to which the invention applies comprises a frame face on which two sides are articulated by telescopic hinges allowing the sides to move from a stable open position, in which the hinge-side end, called the "proximal end", of the sides is parallel and in immediate proximity to the hinge-side end, called the "proximal end", of a stub forming part of the frame face, the said proximal ends defining a meeting plane passing between the knuckles of the said hinge, to an unstable over-opened position, by pivoting about a bearing point lying in the said meeting plane, the sides having an external surface and an internal surface, and the frame having a plane of symmetry that is orthogonal to the general plane of the frame face.

According to the invention, the said bearing point is located closer to the said plane of symmetry than the external surface of the sides, measured at the level of the said meeting plane.

This position of the bearing point, which may be alternatively described as "set back from the external surface of the side", causes a frame with thick sides to behave like a frame with thin sides, with the result that less force is needed on the hinge to obtain the same angle of over-opening.

In one particular embodiment, the proximal end of the side and that of the stub have a meeting zone and the bearing point is located on the outer edge of the said meeting zone.

Advantageously, the proximal end of the side and/or that of the stub has a recess, from the external surface of the said side and/or that of the said stub. This gives rise to a reduction in the thickness of the meeting zone compared to what it would be if the meeting zone were as thick as the side, and this reduction can be as much as to give this zone the thickness of a metal side.

Preferably, the said recess, which may for example be a chamfer, reduces the proximal end of the side and/or that of the stub to a thickness of less than 1.5 mm; in other words, the meeting zone is less than 1.5 mm thick.

In another particular embodiment, the thickness of the meeting zone may even be zero or almost zero. Thus, the said recess may be in the form of a gap of 1 mm to 5 mm between the proximal end of the side and that of the stub, in which case the bearing point is located on the hinge itself. This embodiment can be applied inexpensively to sides made of acetate or injection-moulded thermoplastic. Specifically, all that is required is for this geometry to be provided for in the machining of such sides, or in the shape of the injection mould, to obtain the desired sides.

In the prior art, in the stable normal open configuration, the sides are substantially perpendicular to the frame face. For this purpose, the hinges are designed so that, in the normal open position, the external surfaces of the stub and the side are aligned when the proximal ends are in abutment. This means that in the position of over-opening by an angle α, generally of 2 to 8°, there is a not very attractive "break" in the line between the external surface of the stub secured to the frame face and the external surface of the side.

To overcome this aesthetic disadvantage, the invention proposes integrating the angle α in the design of the frame. To this end, in the stable normal open position, the external surface of the side makes an angle that is reentrant with respect to the plane of the external surface of the stub.

The invention will be more clearly understood on reading the following description, in conjunction with the attached drawings, in which:

FIG. 1a is a top view of the telescopic articulation zone of a spectacle frame with thin sides of the prior art, in the stable open position;

FIG. 1b is a top view of the same articulation zone as in FIG. 1a but in the unstable over-opened position;

FIG. 3a is a top view of the telescopic articulation zone of a frame with thick sides according to a first embodiment of the invention, in the stable open position;

FIG. 3b is a top view of the same articulation zone as in FIG. 3a but in the unstable over-opened position;

Figures 2A, 2B:
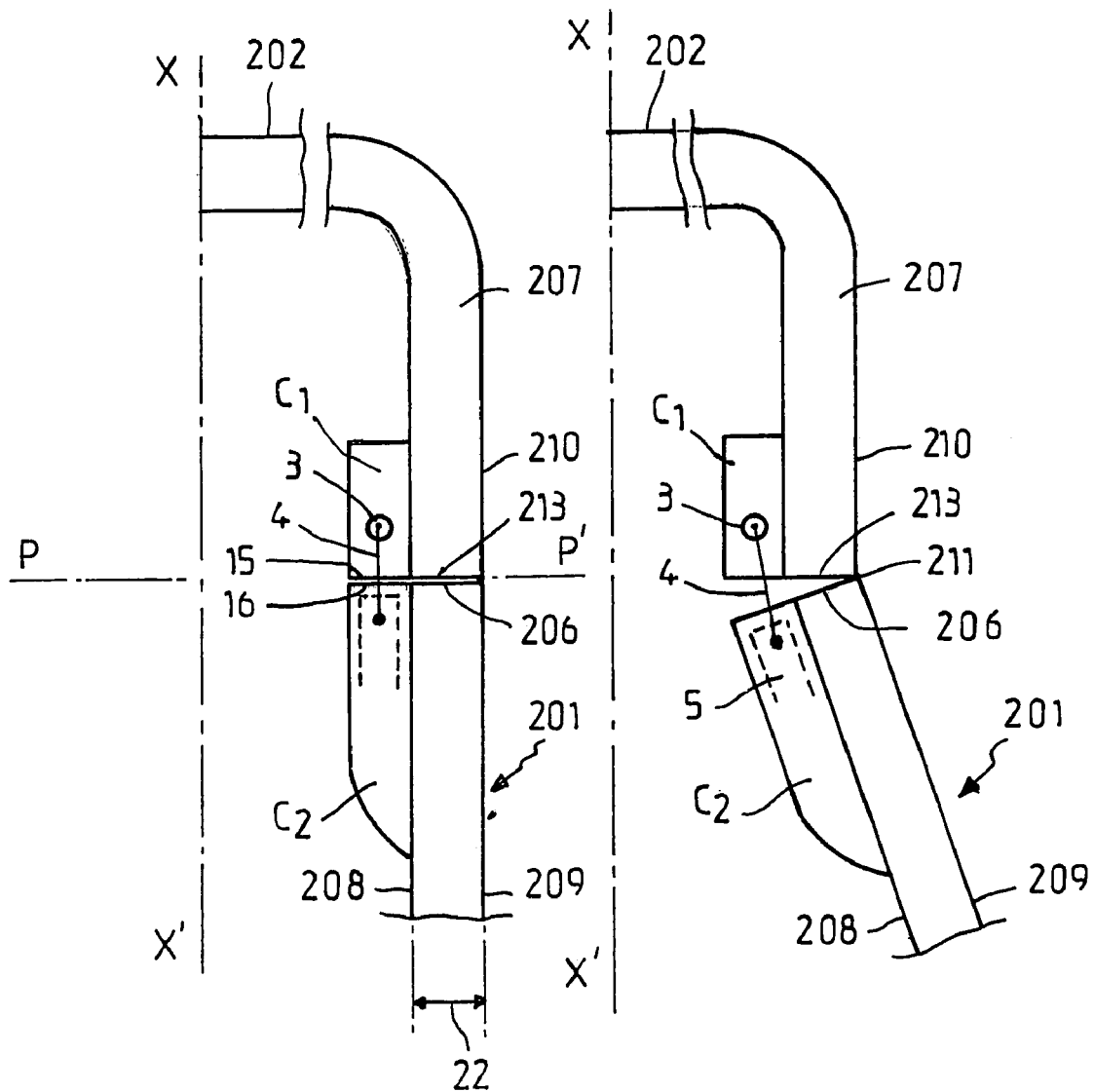
FIG. 2a is a top view of the telescopic articulation zone of a spectacle frame with thick sides of the prior art, in the stable open position.
FIG. 2b is a top view of the same articulation zone as in FIG. 2a but in the unstable over-opened position.

FIG. 1 shows part of one of the two thin sides 101 of a spectacle frame of the prior art, and part of the frame face 102 to which it is articulated by means of a telescopic hinge C1, C2 whose pivoting point 3, tie-rod 4 and return spring 5 are shown diagrammatically. The side 101 comprises a hinge-side end 106, called the "proximal end", which is parallel and in immediate proximity to a hinge-side end 113, called the "proximal end", of a stub 107 forming part of the frame face 102. The proximal ends 106 and 113 have a face-to-face zone or meeting zone Z1. The knuckles C1 and C2 likewise have proximal ends 15 and 16 facing each other. The meeting zone Z1 lies in a meeting plane P, P' passing between the proximal faces 15 and 16 of the knuckles and the proximal ends 106 and 113, respectively, of the side 101 and of the stub 107. The side 101 has an internal surface 108 and an external surface 109. In FIG. 1a, the side 101 is in the stable open position and its external surface 109 is aligned with that 110 of the stub 107.

FIG. 1b shows the same frame portion as FIG. 1a but in this case it has moved into the unstable over-opened position by pivoting about a bearing point 111 located on the outer edge of the meeting zone Z1, in opposition to the force of the spring 5. In this position, the external surface 109 of the side 101 makes an angle α of between 2 and 8° with the external surface 110 of the stub 107 of the frame face 102.

FIGS. 2a and 2b, in which elements that are the same as in FIGS. 1a and 1b bear the same references and elements that have been modified but fulfil a similar role have the references shown in FIGS. 1a and 1b increased by 100, differ from FIGS. 1a and 1b, respectively, only by the fact that the face 202 and the side 201 are, in this case, thick.

Hence, as can be seen by comparing FIGS. 2a and 2b, the meeting zone Z2 is thicker than the zone Z1 and, therefore, the distance between the bearing point 211 and the pivoting point 3 of the hinge is markedly greater in the case of the thick side 201 than in the case of the thin side 101. As a result, for the same angle of over-opening, a greater length of tie-rod 4 must be pulled out of the hinge in the case of a thick side 201, meaning that the spring 5 must be more compressed. The spring therefore exerts a greater return force, which is uncomfortable for the wearer.

FIGS. 3a and 3b, in which elements that are the same as in FIGS. 1a and 1b bear the same references and elements that have been modified but fulfil a similar role have the references shown in FIGS. 1a and 1b increased by 200, differ from FIGS. 2a and 2b, respectively, only by the fact that the proximal end 313 of the stub 307 has a chamfer 12. By virtue of this chamfer 12, the meeting zone Z3 is reduced to a thickness close to that of the meeting zone Z1 and the bearing point 311 is closer to the pivoting point 3 than in FIG. 2b, for the same side thickness. In fact, it may be at the same distance from the pivoting point 3 as in the case of FIG. 1b, which depicts a thin side 101.

Figures 4A, 4B:
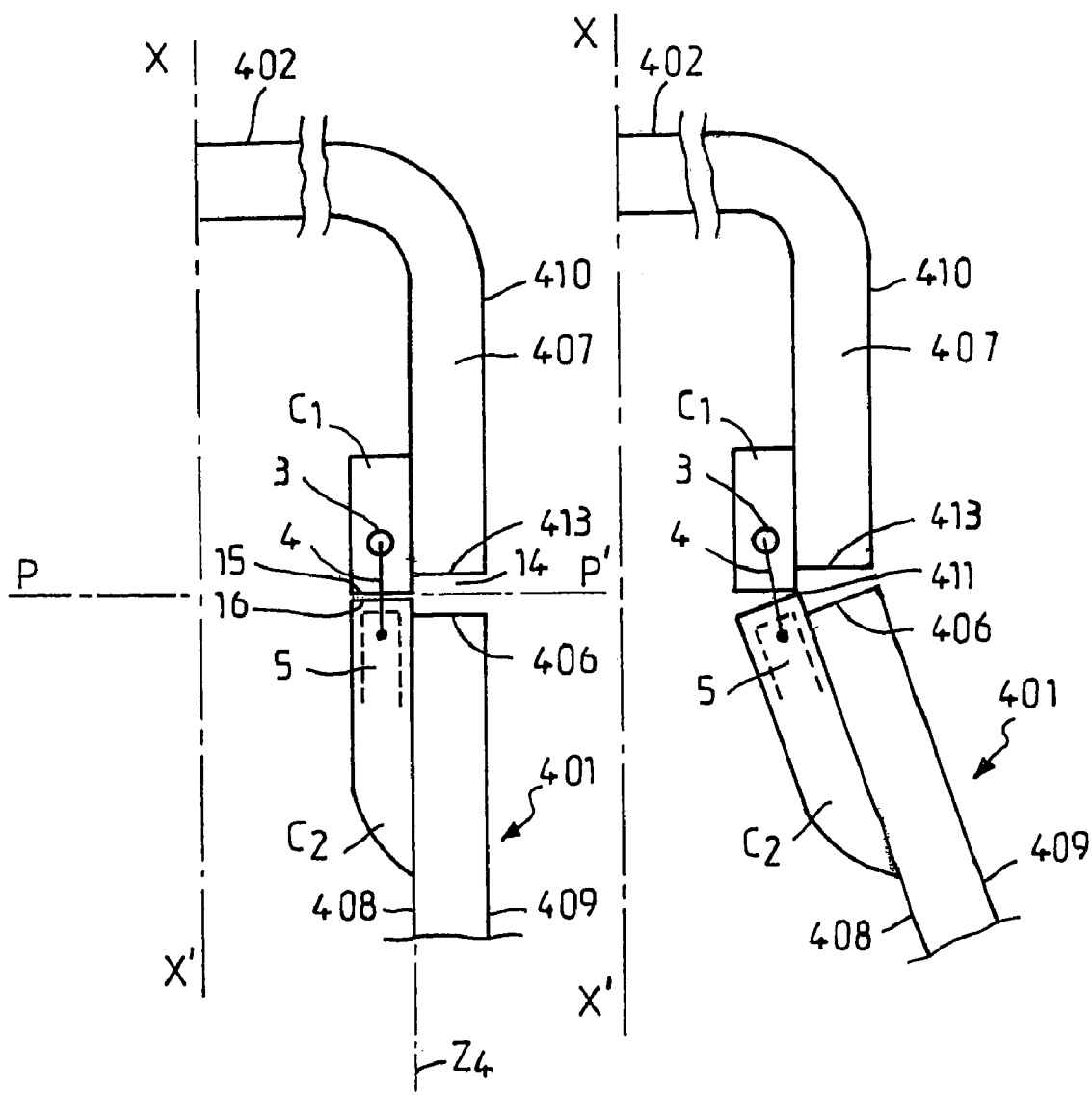
FIG. 4a is a top view of the telescopic articulation zone of a frame with thick sides according to a second embodiment of the invention, in the stable open position.
FIG. 4b is a top view of the same articulation zone as in FIG. 4a but in the unstable over-opened position.

FIGS. 4a and 4b, in which elements that are the same as in FIGS. 1a and 1b bear the same references and elements that have been modified but fulfil a similar role have the references shown in FIGS. 1a and 1b increased by 300, show one of the two sides 401 of a spectacle frame according to a second embodiment of the invention. This time, there is a gap 14 between the proximal end 406 of the side 401 and the proximal end 413 of the stub 407. The meeting zone Z4 now has a zero thickness and the bearing point 411 coincides with the outer edge of the zone where the facing end faces 15 and 16 of the knuckles C1 and C2 of the hinge meet. By virtue of this gap 14, the bearing point 411 is as close as possible to the pivoting point 3 since it is even closer than in the case of the thin sides of FIGS. 1a and 1b, even though this is a frame with thick sides.

Figures 5A, 5B:
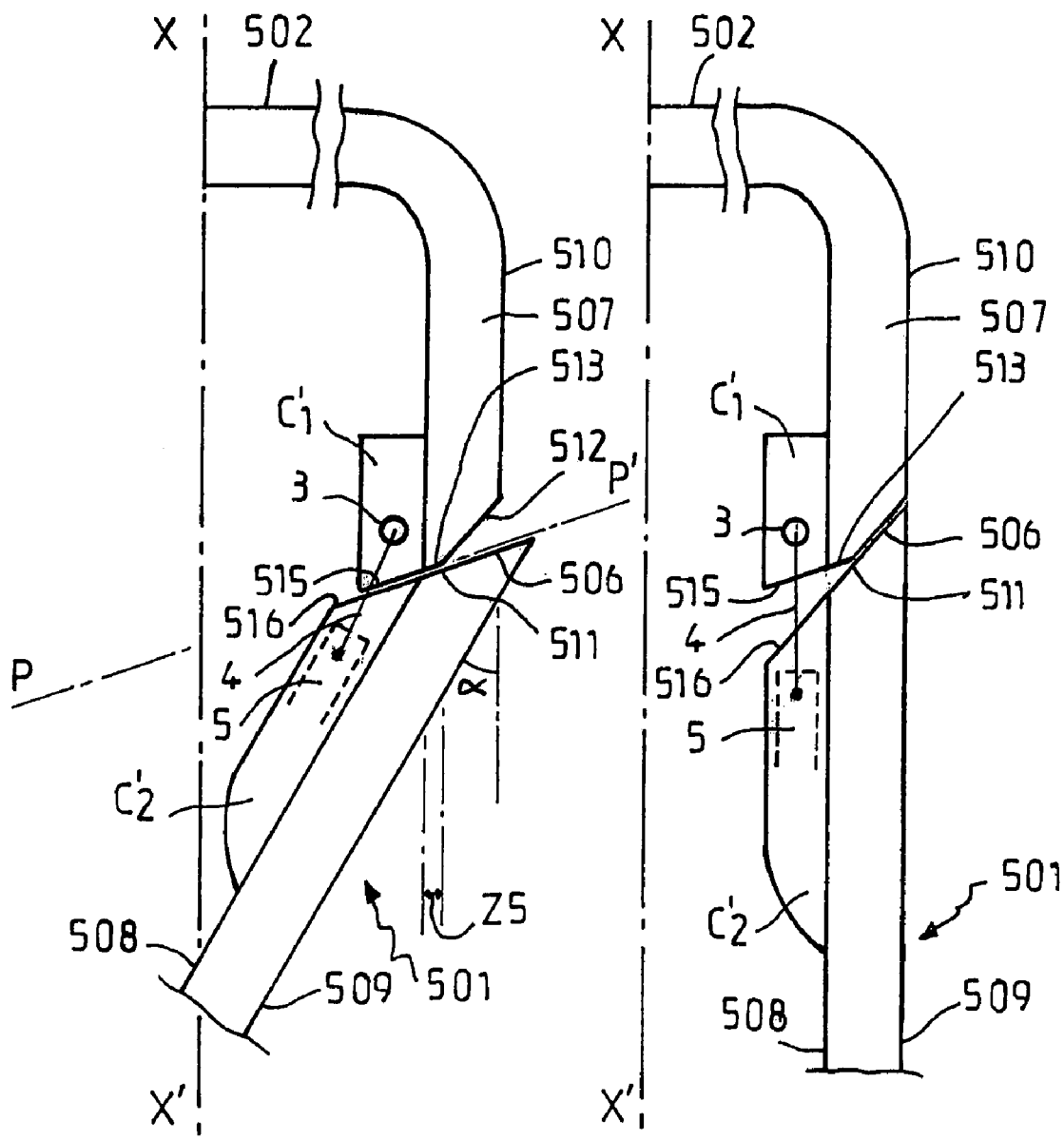
FIG. 5a is a top view of the telescopic articulation zone of a frame with thick sides according to a third embodiment of the invention, in the stable open position.
FIG. 5b is a top view of the same articulation zone as in FIG. 5a but in the unstable over-opened position.

FIGS. 5a and 5b, in which elements that are the same as in FIGS. 1a and 1b bear the same references and elements that have been modified but fulfil a similar role have the references shown in FIGS. 1a and 1b increased by 400, show one of the two sides 501 of a spectacle frame according to a third embodiment of the invention. Unlike the preceding modes of implementation, in the unstable over-opened position, the external surface 509 of the side 501 and the external surface 510 of the stub 507 are aligned in the unstable over-opened position, which is the position in which the spectacles are worn. To achieve this look, changes have been made to the proximal end 506 of the side 501 and to the proximal end 513 of the stub 507, and also to the facing end faces 515 and 516 of the hinge C1', C2'. More specifically, these ends 506, 513, 515 and 516 are bevelled such that in the stable open position (FIG. 5a), the external surface 509 of the side 501 makes a angle α that is reentrant with respect to the plane of the external surface 510 of the stub 507. Except for this particular arrangement, the embodiment of FIGS. 5a, 5b is of the same type as that of FIGS. 3a, 3b in that the meeting zone Z5 is thinner owing to the chamfering of the stub 507 at 512. Thus, the bearing point 511 is closer to the pivoting point.

Naturally, the invention is not limited to the embodiments described and illustrated. Thus, for example, the chamfer 12 or 512 could be made in the proximal end of the side instead of being made in the proximal end of the stub. Moreover, a recess made in any form other than a chamfer would also be possible.

The invention claimed is:

1. A spectacle frame comprising a frame face on which two sides are articulated by telescopic hinges allowing the sides to move from a stable open position, in which the hinge-side end, called the "proximal end", of the sides is parallel and in immediate proximity to the hinge-side end, called the "proximal end", of a stub forming part of the frame face, the said proximal ends defining a meeting plane, passing between the knuckles of the said hinge, to an unstable over-opened position, by pivoting about a bearing point lying in the said meeting plane, the sides having an external surface and an internal surface, and the frame having a plane of symmetry, that is orthogonal to the general plane of the frame face, wherein the said bearing point is located closer to the said plane of symmetry, than the external surface of the sides, measured at the level of the said meeting plane.

2. A frame according to claim 1, wherein the proximal end of the side and that of the stub have a meeting zone and in that the said bearing point is located on the outer edge of the said meeting zone.

3. A frame according to claim 1, wherein the proximal end of the side and that of the stub have a meeting zone and in that the said bearing point is located on the outer edge of the said meeting zone, the thickness of the meeting zone going from a thickness smaller than that of the side to a zero thickness.

4. A frame according to claim 1, wherein the proximal end of the side and/or that of the stub has a recess, from the external surface of the said side and/or that of the said stub.

5. A frame according to claim 1, wherein the proximal end of the side and/or that of the stub has a recess, from the external surface of the said side and/or that of the said stub, said recess reducing the proximal end of the side and/or that of the stub to a thickness of less than 1.5 mm.

6. A frame according to claim 1, wherein the proximal end of the side and/or that of the stub has a chamfer, from the external surface of the said side and/or that of the said stub.

7. A frame according to claim 4, wherein the said recess is in the form of a gap of 1 mm to 5 mm between the proximal end of the side and that of the stub.

8. A frame according to claim 1, wherein, in the stable normal open position, the external surface of the side makes an angle ($\alpha$) that is reentrant with respect to the plane of the external surface of the stub.

* * * * *